(12) United States Patent
Osakabe

(10) Patent No.: US 7,787,160 B2
(45) Date of Patent: Aug. 31, 2010

(54) DRIVING DEVICE AND SCANNER

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 857 days.

(21) Appl. No.: 11/678,725

(22) Filed: Feb. 26, 2007

(65) Prior Publication Data

US 2007/0287566 A1 Dec. 13, 2007

(30) Foreign Application Priority Data

Feb. 27, 2006 (JP) .............................. 2006-050368

(51) Int. Cl.
*H04N 1/04* (2006.01)
(52) U.S. Cl. ...................... 358/497; 358/494; 358/496; 358/401
(58) Field of Classification Search ................. 358/497, 358/494, 496, 401, 505, 487
See application file for complete search history.

(56) References Cited

U.S. PATENT DOCUMENTS 6,108,108 A * 8/2000 Peng ........................... 358/497
6,330,084 B1 * 12/2001 Chiang ....................... 358/497
6,801,344 B2 * 10/2004 Morinaga et al. ........... 358/474
2005/0242485 A1 11/2005 Shiohara et al.

FOREIGN PATENT DOCUMENTS

| JP | H03-185966 A | 8/1991 |
| JP | H05-093162 U | 12/1993 |
| JP | H10-086475 A | 4/1998 |

OTHER PUBLICATIONS

Japan Patent Office; Notice of Reasons for Rejection in Japanese Patent Application No. 2006-050368 (counterpart to the above-captioned U.S. patent application) mailed May 21, 2009.

* cited by examiner

*Primary Examiner*—Houshang Safaipour
(74) *Attorney, Agent, or Firm*—Baker Botts L.L.P.

(57) ABSTRACT

The driving device is provided with a motor, a pinion, a first gear, a second gear, and a frame. The frame has a motor side surface and a gear side surface, and includes a first portion and a second portion. A motor housing of the motor is fixed to and supported at the motor side surface of the first portion. A motor shaft extends from the motor housing, penetrating the first portion from the motor side surface to the gear side surface. The pinion is fixed to the distal end of the motor shaft at the gear side surface. The first gear and the second gear are coaxially disposed and rotatably supported at the gear side surface of the second portion. The driving force of the motor is transmitted to the first gear and the second gear through the pinion. The gear side surface of the second portion is offset toward the motor side than the motor side surface of the first portion.

8 Claims, 5 Drawing Sheets

DRIVING DEVICE AND SCANNER

CROSS-REFERENCE TO RELATED APPLICATION

This application claims priority to Japanese Patent Application No. 2006-050368, filed on Feb. 27, 2006, the contents of which are hereby incorporated by reference into the present application.

BACKGROUND OF THE INVENTION

1. Field of the Invention

The present invention relates to a driving device utilized in a scanner and a scanner having such driving device.

2. Description of the Related Art

A scanner having a main body, a scanning member, a belt, and a driving device is known. In such scanner, the scanning member is installed inside the main body. A tempered glass is disposed on the top surface of the main body above the scanning member. The driving device moves the scanning member by driving the belt.

FIG. 5 shows a typical type of a generally known driving device utilized in scanners. The driving device 100 includes a stepping motor 101, a metal frame 102, a motor shaft 103, and a pinion 104. The stepping motor 101 is fixed on the bottom surface of the frame 102, and the motor shaft 103 of the stepping motor 101 penetrates the frame 102. At the distal end of the motor shaft 103 protruding out on the top surface side of the frame 102, a pinion 104 is disposed.

The driving device 100 also includes a reduction gear 110. The reduction gear 110 includes a first gear 111 and a second gear 112. The diameter of the first gear 111 is larger than that of the second gear 112, and the first gear 111 and the second gear 112 are formed as one component, and thus they rotate together. The reduction gear 110 is rotatably supported on the top surface of the frame 102 in a manner that the first gear 111 is disposed in between the second gear 112 and the frame 102, and the first gear 111 is engaged with the pinion 104.

Further, the driving device 100 includes an interposing gear 120. The interposing gear 120 includes a third gear 121 and a pulley 122. The third gear 121 and the pulley 122 are formed as one component, and thus they rotate together. The interposing gear 120 is rotatably supported on the top surface of the frame 102 in a manner that the third gear 121 is disposed in between the pulley 122 and the frame 102, and the third gear 121 is engaged with the second gear 112 of the reduction gear 110.

Furthermore, a belt (not shown in the figure) is wound around the pulley 122 of the interposing gear 120.

When utilizing the driving device 100, a driving force generated by the stepping motor 101 is transmitted from the pinion 104 to the first gear 111 of the reduction gear 110, and then from the second gear 112 of the reduction gear 110 to the third gear 121 of the interposing gear 120. Finally, the driving force is transmitted from the pulley 122 of the interposing gear 120 onto the belt not shown in the figure. The belt is driven to move the scanning member.

The driving device 100 of FIG. 5 engages the second gear 112 of the reduction gear 110 and the third gear 121 of the interposing gear 120, while maintaining the pulley 122 higher than the other gears so as to secure the working liability for the process of winding the belt onto the pulley 122. This requires the interposing gear 120 to be supported on the frame 102 at certain distance therefrom. The shaft 123 for the interposing gear 120 must be elongated in the orthogonal direction with respect to the frame 102.

FIG. 6 shows another typical type of a generally known driving device utilized in scanners. The detailed description of the driving device 200 in common with the driving device 100 of FIG. 5 will be abridged. However, the driving device 200 in FIG. 6 differs widely from the driving device 100 in that the reduction gear 210 is rotatably supported on the top surface of the frame 102 in a manner that the second (smaller) gear 212 is disposed in between the first (larger) gear 211 and the frame 102.

With this driving device 200, similarly, a driving force generated by the stepping motor 201 is transmitted from the pinion 204 to the first gear 211 of the reduction gear 210, and then from the second gear 212 of the reduction gear 210 to the third gear 221 of the interposing gear 220. Finally, the driving force is transmitted from the pulley 222 of the interposing gear 220 onto a belt not shown in the figure.

The driving device 200 of FIG. 6 has the reduction gear 210 with the first (larger) gear 211 disposed above the second (smaller) gear 212. The pinion 204 is required to be engaged with the first gear 211, which is remote from the frame 202. For this reason, the motor shaft 203 is elongated in the orthogonal direction with respect to the frame 202.

Aside from the driving devices described above, a driving device including a motor and an interposing gear is known. As is taught in the Japanese Patent Application Publication No. 10-86475, such driving device further includes a pinion engaged with a third gear of an interposing gear.

The motor of the driving device described above has a motor shaft, on which a pinion is fixed. The pinion is disposed at the distal end of the motor shaft far from the frame. The motor shaft must be elongated in the orthogonal direction.

In the driving device 100 of FIG. 5, the shaft 123 is elongated. The shaft 123 trembles when the stepping motor 101 transmits the driving force onto the belt not shown in the figure. Also, in the driving device 200 of FIG. 6, the motor shaft 203 is elongated. The motor shaft 203 trembles when the stepping motor 201 transmits the driving force onto the belt not shown in the figure. In the driving device of the Japanese Patent Application Publication No. 10-86475, the motor shaft with the pinion disposed at the distal end is elongated. The motor shaft trembles when the motor transmits the driving force to the belt.

In all of the cases above, the trembling of the shaft is transmitted onto the belt. The trembling transmitted to the belt causes the movement of the scanning member to sway in an inappropriate direction. In such case, the scanning member cannot be moved precisely.

Furthermore, the driving device 100 of FIG. 5 has four height positions in the orthogonal direction with respect to the frame 102, that is, the direction parallel to the motor shaft 103 or the shafts of the reduction gear 110 and of the interposing gear 120. Such height position will be referred to as "level" in the description below. Hence, the driving device 100 has four levels: a level of which the stepping motor 101 is located, a level of which the pinion 104 and the first gear 111 of the reduction gear 110 are located, a level of which the second gear 112 of the reduction gear 110 and the third gear 121 of the interposing gear 120 are located, and a level of which the pulley 122 of the interposing gear 120 and the belt not shown in the figure are located. The four levels are stacked on top of each other, thus thickening the orthogonal space which the driving device 100 occupies when installed into the scanner.

The driving device 200 of FIG. 6 has three levels: a level of which the stepping motor 201 is located, a level of which the second gear 212 of the reduction gear 210 and the third gear 221 of the interposing gear 220 are located, and a level of which the pinion 204, the first gear 211 of the reduction gear"

210, the pulley 222 of the interposing gear 220 and the belt not shown in the figure are located. The three levels are stacked on top of each other, again thickening the orthogonal space which the driving device 200 occupies when installed into the scanner.

BRIEF SUMMARY OF THE INVENTION

The objective of the present invention is to provide a compact driving device that allows the scanning member be moved precisely along the scanning direction. To achieve such objective, the following technique is taught in the present specification.

The driving device disclosed in the present specification comprises a motor, a pinion, a first gear, a second gear, and a frame. The frame has a motor side surface and a gear side surface, and includes a first portion and a second portion. The gear side surface of the second portion is offset toward the motor side than the motor side surface of the first portion. A motor housing of the motor is fixed to and supported at the motor side surface of the first portion. A motor shaft extends from the motor housing, penetrating the first portion from the motor side surface to the gear side surface. The pinion is fixed to the distal end of the motor shaft at the gear side surface. The first gear and the second gear are coaxially disposed and rotatably supported at the gear side surface of the second portion. The second gear is disposed between the first gear and the frame. The driving force of the motor is transmitted through the pinion, the first gear and the second gear. For the diameter of the second gear is smaller than the diameter of the first gear, the first and the second gears act as the reduction gears.

In the driving device described above, the pinion and the first gear are disposed at the same level in the orthogonal direction with respect to the frame. Further, the surface of the motor housing in contact with the motor side surface of the frame is within a more nearing range of level in the orthogonal direction with respect to the frame to the first gear than the surface of the second gear facing the gear side surface of the frame. The driving device can be assembled much compactly in comparison with the generally known driving devices. With the driving device being much compact, especially in the orthogonal direction with respect to the frame, the length of the shafts can be shortened, thus the trembling of the shafts are reduced. When such driving device is incorporated into a scanner for driving the scanning member, the trembling transmitted to the scanning member is reduced. It allows the scanning member to scan precisely.

DETAILED DESCRIPTION OF THE INVENTION

The embodiment of the present invention will be described in detail below with reference to the figures.

(1. The Overall Configuration)

Figure 1:
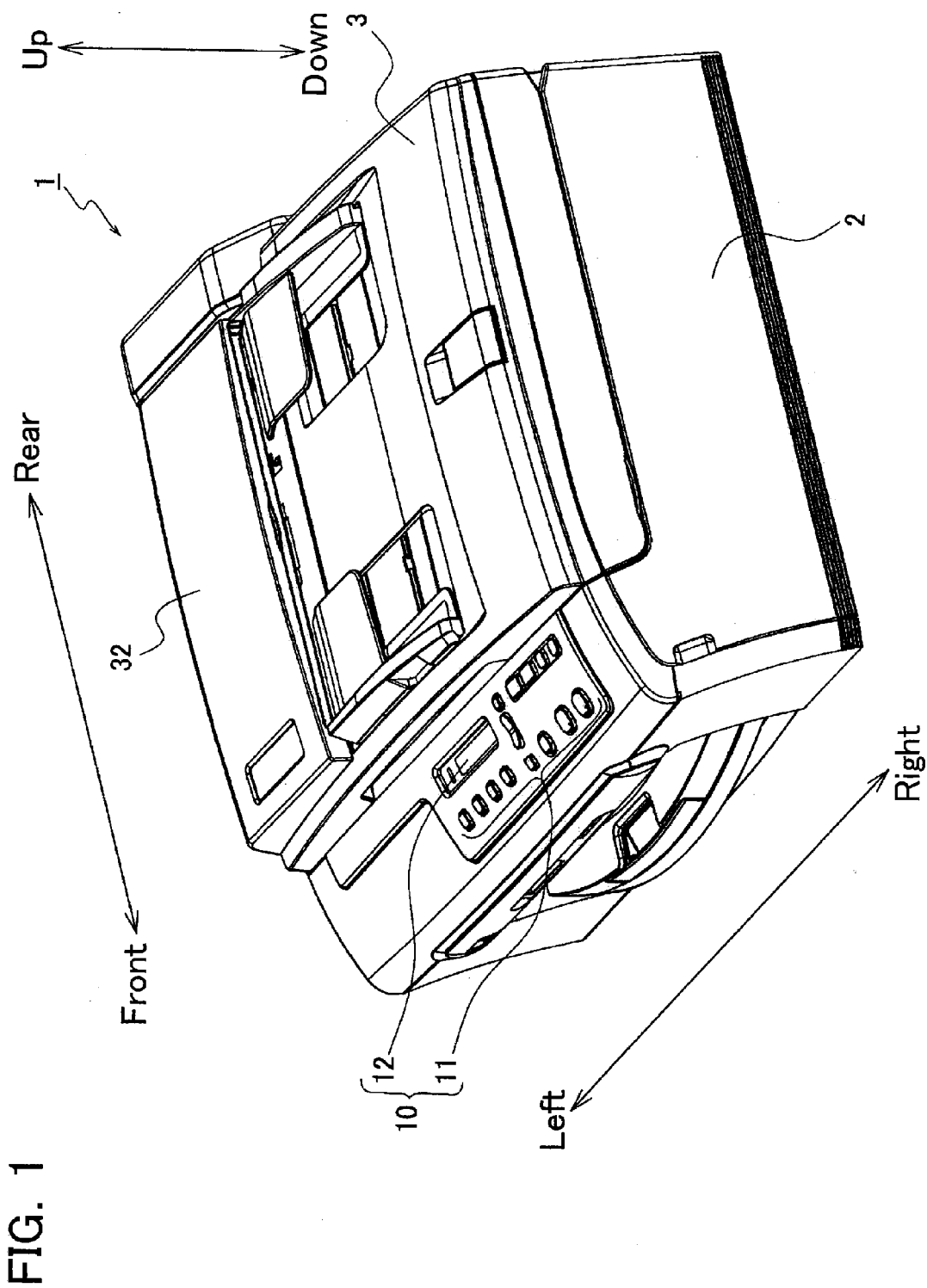
FIG. 1 shows a perspective view of a multi-function device of the present embodiment.

FIG. 1 shows a perspective view of a multi-function device 1 of the present embodiment.

The multi-function device 1 of the present embodiment comprises printing function, as well as functions such as scanning function, color copying function, facsimile function, etc. As shown in FIG. 1, the multi-function device 1 has a main body 2 made of synthetic resin. The main body 2 is rectangular and parallelepiped.

On the top surface of the front part of the multi-fuinction device 1, an operation panel 10 is disposed. The operation panel 10 includes buttons 11 for inputting operation commands and a display monitor 12 (for example, a LCD) to display messages and images. At the rear side of the operation panel 10, a scanner unit 3 is disposed. The scanner unit 3 is used to scan images from documents. The scanner unit 3 is utilized to enforce scanning function, color copying function, and facsimile function of the multi-function device 1.

In the description below, the expressions regarding directions will be described based on the directions of which the multi-function device 1 is normally set up as shown in FIG. 1. The expressions regarding front and rear directions will be described with respect to the side where the operation panel 14 is formed as front. The expressions regarding left and right directions will be described with respect to the front view of the multi-function device 1. The expressions regarding vertical directions will be described with respect to the vertical direction of the multi-function device 1 normally set up as shown in FIG. 1.

(2. Configuration of the Scanner Unit 3)

Figure 2:
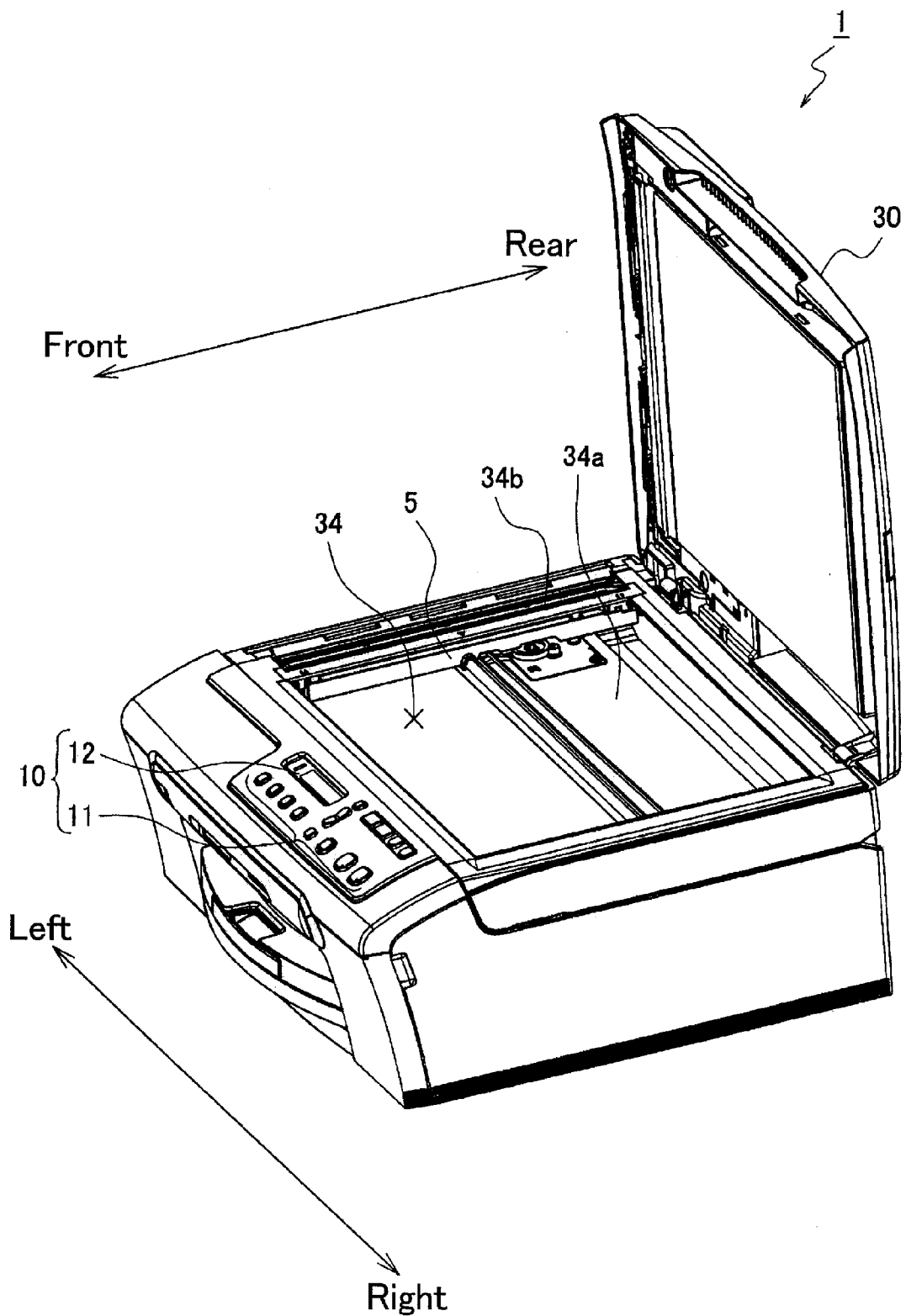
FIG. 2 shows a perspective view of a multi-function device of the present embodiment with the cover member of the scanner unit opened.

FIG. 2 shows a perspective view of a multi-function device 1 of the present embodiment with the cover 30 of the scanner unit 3 opened.

The scanner unit 3 of the present embodiment is incorporated into the multi-function device 1. An auto document feeder 32 (as shown in FIG. 1) is included in the cover 30. A tempered glass 34 is disposed on the top surface of the main body 2 of the scanner unit 3. The tempered glass 34 is exposed when the cover 30 is opened. Beneath the tempered glass 34, a space is provided for a scanning device 5 to move therein.

The multi-function device 1 of the present embodiment is capable of two types of scan; that is, a scanning of documents supplied by the auto document feeder 32, and a scanning of the documents placed on top of the tempered glass 34. The tempered glass 34 has a first glass section 34a and a second glass section 34b. The first glass section 34a is extended in the widthwise direction (the left and right direction). It is utilized in scanning the documents placed on top of the tempered glass 34. The second glass section 34b is disposed on the left side of the first glass section 34a. The widthwise length of the second glass section 34b is shorter than that of the first glass section 34a. It is utilized in scanning the documents that are sent from the auto document feeder 32. In the case of scanning documents that are placed on top of the first glass section 34a, the scanning device 5 is moved in the left and right direction to scan the document. In the case of scanning documents fed by the auto document feeder 32, the scanning device 5 is halted under the second glass section 34b, and scans the document that passes through above the second glass section 34b.

(2-1. Configuration of the Scanning Device 5)

Figure 3A:
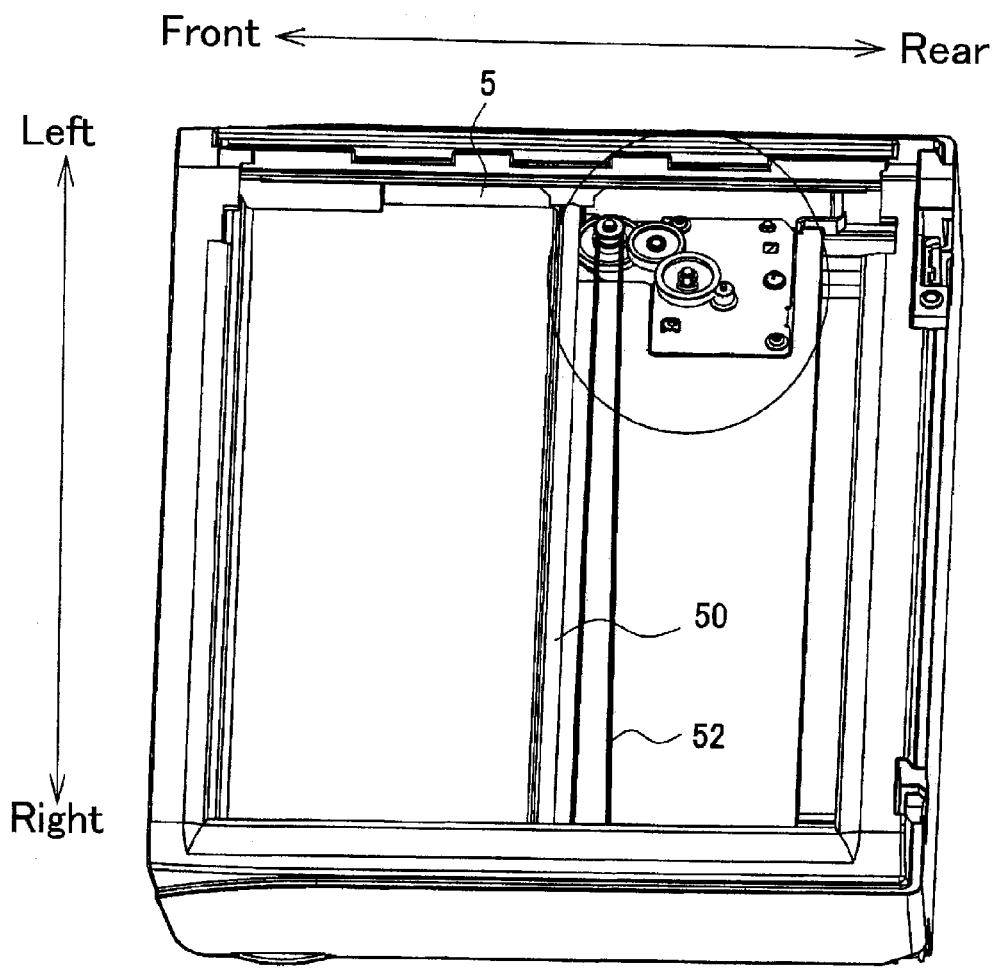
FIG. 3A shows a perspective view of the tempered glass part of the scanner unit.
Figure 3B:
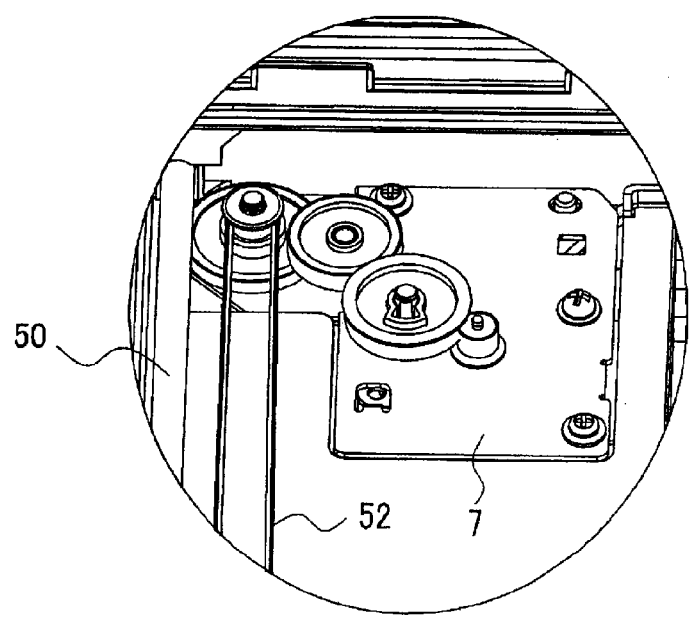
FIG. 3B shows an enlarged perspective view of the driving device.

As shown in FIG. 3A, the scanning device 5 that is included in the scanner unit 3 of the present embodiment scans the documents by using a so-called the CIS (Contact Image Sensor) system. The scanning device 5 has a rectangular shape, extending in the front and rear direction. At the center of the front and rear direction of the space provided for the scanning device 5 to move within the main body 2, a guide rail 50 extends in the left and right direction. The scanning device 5 installed within the space moves along guide rail 50 in the leftward and rightward direction. Further, at the center of the front and rear direction within the space, a loop belt 52 is disposed. The loop belt 52 extends in the left and right direction along the guide rail 50. A part of the loop belt 52 is fixed to the scanning device 5, and moves the scanning device 5 leftward and rightward within the space as the loop belt 52 rotates. On the left side of the loop belt 52 and at the bottom surface of the space, as shown in FIG. 3B, a driving device 7 is disposed.

(2-2. The Driving Device 7)

Figure 4A:
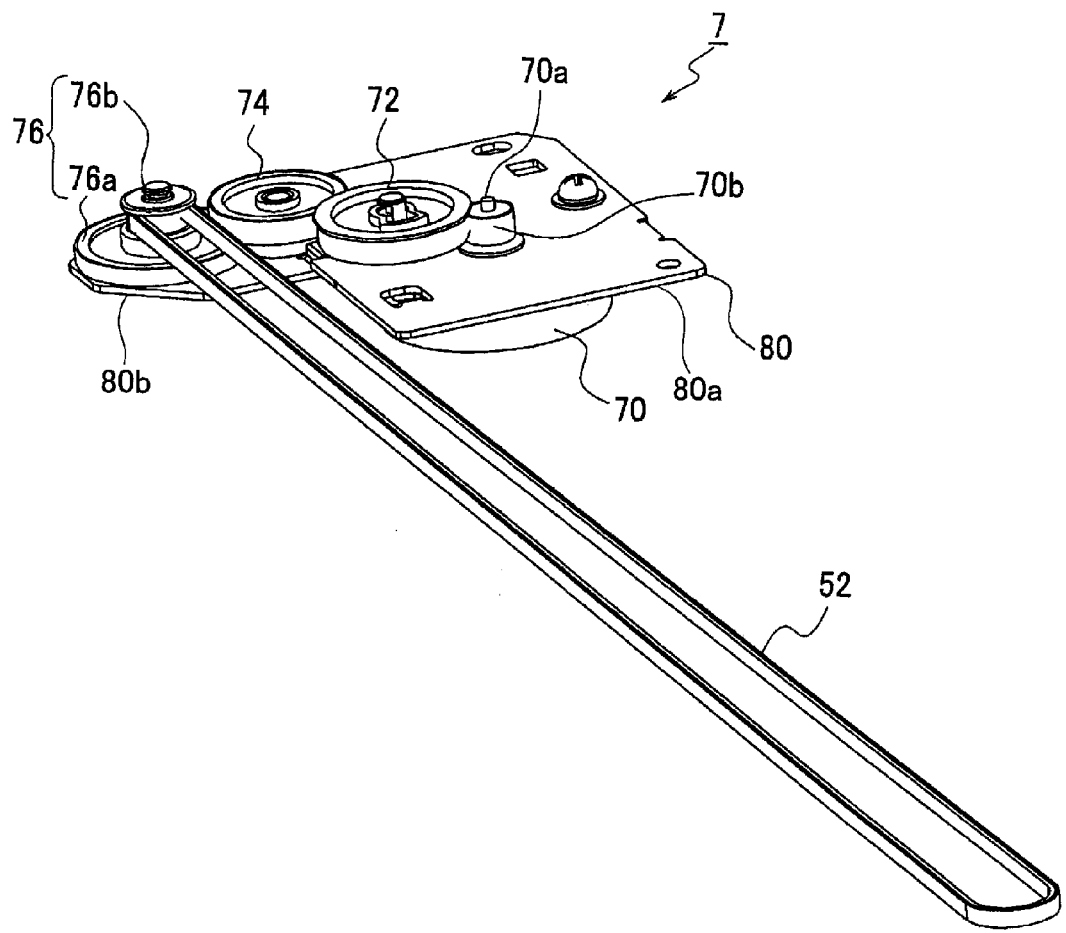
FIG. 4A shows a perspective view of the driving device and the loop belt.
Figure 4B:
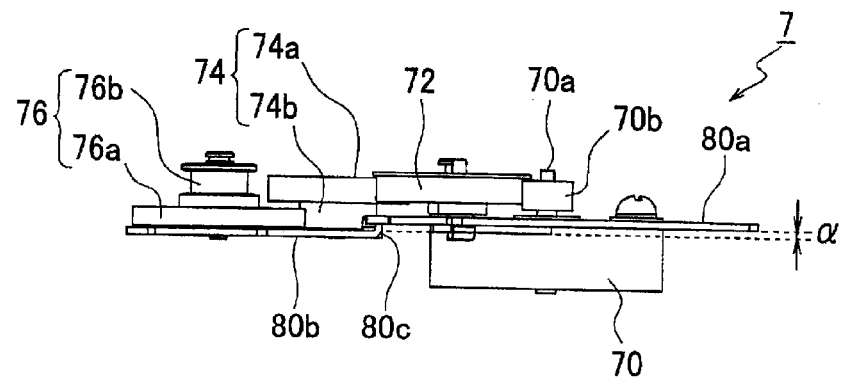
FIG. 4B shows a side view of the driving device.

As shown in FIG. 4A, the driving device 7 includes a stepping motor 70, an idler gear 72, a reduction gear 74, and a interposing gear 76. The aforementioned components 70 to 76 are supported on an iron frame 80. The frame 80 has a motor side surface and a gear side surface. In FIGS. 4A and 4B, the motor side surface is shown as the bottom surface, and the gear side surface is shown as the top surface. The frame 80 also includes a first portion 80a for supporting the motor 70 and the idler gear 72, and a second portion 80b for supporting the reduction gear 74 and the interposing gear 76. In FIGS. 3A and 3B, the first portion 80a is located on the rear side of the frame 80, and the second portion 80b is located on the front side of the frame 80. In the frame 80, the gear side surface (the top surface of the frame 80 in FIG. 4) of the second portion 80b (the front side portion of the frame 80 in FIG. 3) is offset toward the motor side (the lower direction of the frame 80 in FIG. 4) than the motor side surface (the bottom surface of the frame 80 in FIG. 4) of the first portion 80a (the rear side portion of the frame 80 in FIG. 3). The frame 80 is fixed on the bottom surface of the main body 2.

The stepping motor 70 is fixed on the motor side surface of the first portion 80a of the frame 80. A through hole not shown in the figure is formed on the first portion 80a of the frame 80. The motor shaft 70a of the stepping motor 70 penetrates to the gear side surface via the through hole. At the distal end of the motor shaft 70a on the top surface side, a pinion 70b is fixed. The pinion 70b rotates with the motor shaft 70a.

The idler gear 72 is supported by a shaft on the gear side surface of the first portion 80a of the frame 80. The idler gear 72 is disposed between the pinion 70b and the reduction gear 74. The idler gear 72 is engaged with the pinion 70b. The driving force generated by the stepping motor 70 is transmitted from the pinion 70b to the idler gear 72.

As shown in FIG. 4B, the reduction gear 74 includes a first gear 74a and a second gear 74b. The diameter of the first gear 74a is larger than that of the second gear 74b. The first gear 74a and the second gear 74b are made as one component and of resin. The first gear 74a and the second gear 74b are coaxially supported by a shaft on the gear side surface of the second portion 80b of the frame 80. The first gear 74a and the second gear 74b rotate together thereon. The second gear 74b is disposed in between the first gear 74a and the gear side surface of the frame 80. The first gear 74a is engaged with the idler gear 72. The second gear 74b is engaged with the interposing gear 76. The driving force of the stepping motor 70 from the force input side is transmitted to the first gear 74a via the pinion 70b and the idler gear 72. The second gear 74b is rotated along with the first gear 74a, and the driving force is transmitted to the interposing gear 76 on the force output side via the second gear 74b.

The interposing gear 76 includes a third gear 76a and a pulley 76b. The third gear 76a and the pulley 76b are made as one component, and of resin. The third gear 76a and the pulley 76b are coaxially supported by a shaft on the gear side surface of the second portion 80b of the frame 80. The third gear 76a and the pulley 76b rotate together thereon. The third gear 76a is disposed in between the pulley 76b and the gear side surface of the frame 80. The third gear 76a is engaged with the second gear 74b. As shown in FIG. 4A, the loop belt 52 is wound around the pulley 76b. The driving force of the stepping motor 70 from the force input side is transmitted to the third gear 76a via the pinion 70b, idler gear 72, and the reduction gear 74. The pulley 76b is rotated along with the third gear 76a, and the driving force is transmitted onto the loop belt 52 via the pulley 76b.

Further, as shown in FIG. 4B, the frame 80 includes the first portion 80a and the second portion 80b. The frame 80 includes a step 80c between the offset portions; that is, the two portions 80a, 80b are located on a different orthogonal position with respect to the frame 80. The level difference of the step 80c is shown as α a in FIG. 4B. The level difference α is utilized to support the stepping motor 70 in a manner that the surface of the second gear 74b facing the frame 80 is disposed at a lower orthogonal level than the surface of the stepping motor 70 facing the frame 80.

With the driving device 7 of the multi-function device 1 configured as above, effects described as below can be achieved.

Figure 5:
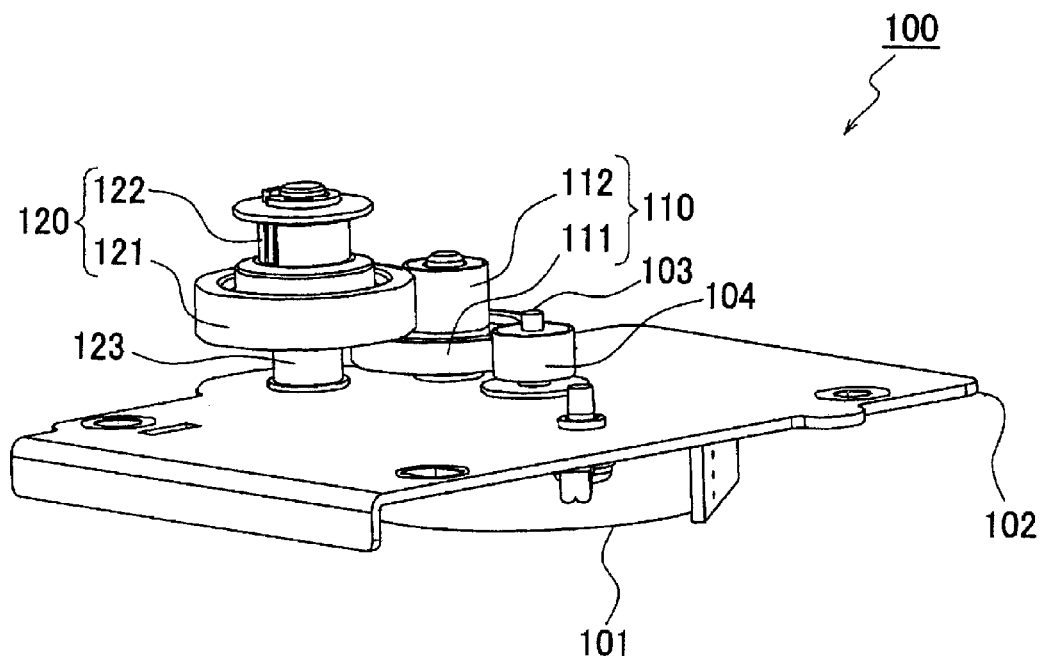
FIG. 5 shows a perspective view of a typical type of a generally known driving device.
Figure 6:
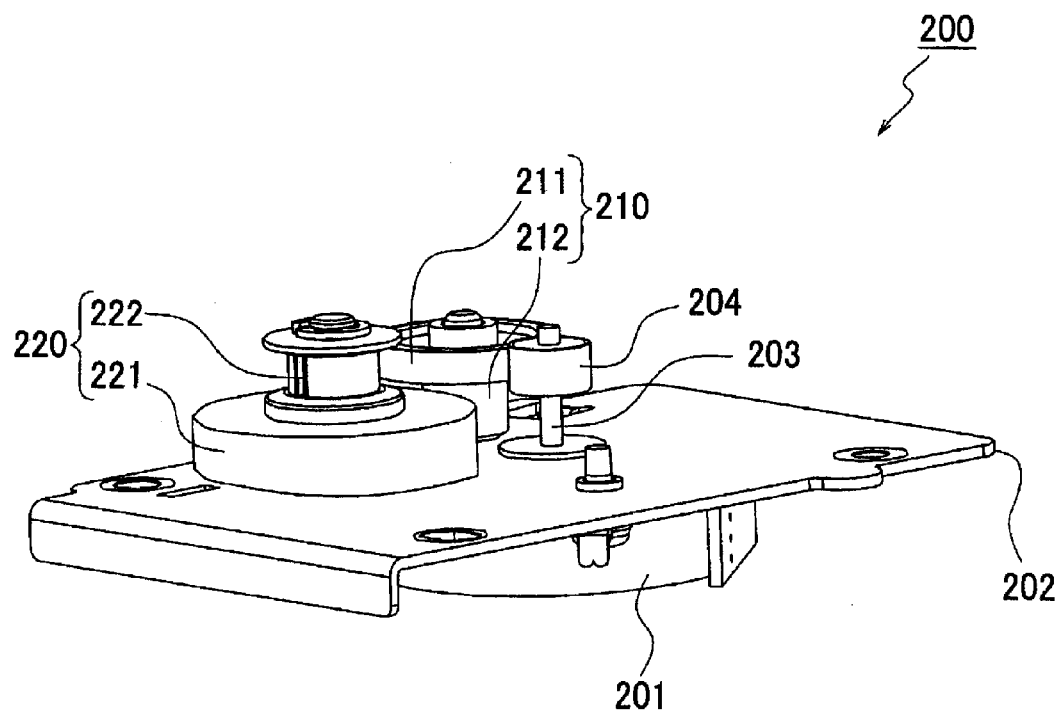
FIG. 6 shows a perspective view of another typical type of a generally known driving device.

In the driving device 7, the pinion 70b and the first gear 74a are disposed at the same level. Further, the stepping motor 70 is disposed so that the surface of the stepping motor 70 on the side of which the pinion 70b is disposed (which will be referred to as a transmission surface in the explanation below) is within a more nearing range of level to the first gear 74a than the level of the surface of the second gear 74b facing the frame 80. The stepping motor 70 is disposed at a closer position to the first gear 74a in comparison with the generally known driving devices (for examples, see FIG. 5, and FIG. 6). With such configuration, the second gear 74b and the stepping motor 70 may be allowed to be disposed on the same level, depending on the size of the stepping motor 70. In such case, the driving device 7 will only have two levels in the orthogonal direction. Hence, the driving device 7 of such embodiment can be assembled much compactly in comparison with the generally known driving devices.

Further, in the driving device 7, the transmission surface of the stepping motor 70 is disposed closer to the pinion 70b as compared with the generally known driving devices. The length of the motor shaft 70a between the pinion 70b and the transmission surface may be shortened (especially compared with the driving device shown in FIG. 6). The length of the motor shaft 70a can be shortened. The trembling of the motor shaft 70a that had occurred with the generally known driving device is hence prevented in the driving device 7. Due to the stableness of the motor shaft 70a, the loop belt 52 is driven precisely. The scanning device 5 is moved precisely.

Further, the driving device 7 as described above can be composed in a compact size, especially in the orthogonal direction with respect to the frame 80. By utilizing the driving device 7 in the scanner unit 3 incorporated into the multi-function device 1 of the present embodiment, the orthogonal size of the scanner unit 3 can be made compact. The size of the multi-function device 1 can be made compact as well. The driving device 7 can move the scanning member 5 precisely. The scanner unit 3 utilizing the driving device 7 is able to scan documents precisely.

In the embodiment described above, the first gear 74a cannot be engaged with the pinion 70b, for the diameter of the first gear 74a is too small. Thus, an idler gear 72 is engaged therebetween. The driving force of the stepping motor 70 is transmitted from the pinion 70b to the idler gear 72, and then to the first gear 74a. The idler gear 72 is disposed at the same level as the pinion 70b and the first gear 74a.

In the case where the frame 80 does not have a step with the level difference α as the driving device 7, the shaft supporting the idler gear 72 will be disposed at the same level as the second gear 74b. In such case, the shaft supporting the idler gear 72 at such distance from the frame 80 is elongated, causing in the trembling of the shaft supporting the idler gear 72 when the driving force is transmitted thereon. As a result, the scanning member 5 cannot be moved precisely.

In the present embodiment, however, the shaft that supports the idler gear 72 is disposed at a level that is in between the pinion 70b and the upper surface of the stepping motor 70 facing the pinion 70b. The idler gear 72 is supported within a more nearing range of level to the frame 80. By utilizing the driving device 7 of the present embodiment, the shaft supporting the idler gear 72 does not tremble. The scanning member 5 can thus be moved precisely.

With the configuration as described above, even when the diameter of the first gear 74a is too small that it is unable to be directly engaged with the pinion 70b and an idler gear 72 is required, the idler gear 72 does not tremble, thus guaranteeing the precise scan of images.

The driving device 7 includes the third gear 76a supported by a shaft on the second portion 80b of the frame 80 so that the third gear 76 is engaged with the second gear 74b. The third gear 76 is disposed on the engaging level with the second gear 74b; that is, on the same level as the second gear 74b and the stepping motor 70. Further, the driving device 7 also includes the pulley 76b, which coaxially rotates together with the third gear 76a on the same shaft. The pulley 76b is disposed on the same level as the pinion 70b and the first gear 74a. Hence, by utilizing the driving device 7, the driving device 7 can be made orthogonally compact even in the case of including the third gear 76a and the pulley 76b.

The third gear 76a is supported by a shaft on the frame 80 in a manner that it is disposed in between the pulley 76b and the frame 80. Hence, the working liability for the process of winding the loop belt 52 onto the pulley 76b is secured. By utilizing the driving device 7, the process of winding the loop belt 52 onto the driving device 7 is efficiently simplified.

The utilization of the driving device 7 enables the scanner unit 3 of the present embodiment to be compact, as well as the assembly of the scanner unit 3 to be easy.

The technical concept of the present invention is not limited to the above embodiment. The present invention can be embodied in various ways within a range that does not deviate from the substance thereof.

In the embodiment described above, the reduction gear 74 and the interposing gear 76 were of a type which the two gears (that is, the first gear 74a and the second gear 74b of the reduction gear 74, and the third gear 76a and the pulley 74b of the interposing gear 76) are formed as one component, and rotated together. However, for example, in the case of the reduction gear 74, the first gear 74a and the second gear 74b can be formed as separate components as long as they coaxially rotate together. Also, in the case of the interposing gear 76, the third gear 76a and the pulley 76b can be formed as separate components as long as they coaxially rotate together.

Furthermore, in the present embodiment, a loop belt 52 was utilized. However, for example, wires can be utilized instead.

Moreover, the driving device 7 described in the present embodiment, had one frame member 80 supporting the idler gear 72, the reduction gear 74, and the interposing gear 76 from one side. However, the gears 72 to 76 can be supported on two frame members 80, with each frame member 80 supporting one of the ends of the each shaft.

What is claimed is:

1. A driving device comprising:
   a motor including a motor housing and a motor shaft;
   a pinion fixed to a distal end of the motor shaft;
   a first gear rotated by the rotation of the pinion;
   a second gear coaxially disposed with the first gear, the second gear being rotated along with the first gear, and the diameter of the second gear being smaller than the diameter of the first gear; and
   a frame having a motor side surface and a gear side surface, and including a first portion for fixedly supporting the motor housing at the motor side surface, and a second portion for rotatably supporting the first and second gears at the gear side surface, wherein the motor shaft penetrates the first portion, the gear side surface of the second portion is offset toward the motor side than the motor side surface of the first portion, and the second gear is disposed between the first gear and the frame.

2. The driving device as in claim 1,
   wherein the frame includes a step between the first portion and the second portion.

3. The driving device as in claim 1,
   further comprising an idler gear disposed between the pinion and the first gear at the gear side surface of the first portion, and the idler gear transmits the driving force of the motor from the pinion to the first gear.

4. The driving device as in claim 1, further comprising:
   a third gear rotatably supported by the frame at the gear side surface of the second portion and meshed with the second gear; and
   a pulley coaxially disposed with the third gear, the pulley being rotated along with the third gear, wherein the third gear is disposed between the pulley and the frame.

5. A scanner comprising:
   a main body including a transparent plate on the top surface;
   a belt extending in a direction within the main body;
   a scanning member fixed to a portion of the belt, and moved in the direction when the belt rotates; and
   the driving device according to claim 1, wherein the driving force of the motor is transmitted to the belt through the pinion, the first gear, and the second gear.

6. The scanner as in claim 5, wherein the frame includes a step between the first portion and the second portion, and
   wherein the belt is supported at the gear side surface of the second portion.

7. The scanner as in claim 5, wherein the driving device further comprises an idler gear disposed between the pinion and the first gear at the gear side surface of the first portion, and the idler gear transmits the driving force of the motor from the pinion to the first gear.

8. The scanner as in claim 5, wherein the driving device further comprises:
   a third gear rotatably supported by the frame at the gear side surface of the second portion and meshed with the second gear, and
   a pulley coaxially disposed with the third gear, the pulley being rotated along with the third gear, wherein the third gear is disposed between the pulley and the frame, and wherein the belt is wound around the pulley.

* * * * *